July 17, 1962  H. S. BERGER  3,044,186
DEVICE FOR ASSISTING IN SWIMMING INSTRUCTION
Filed July 20, 1959  2 Sheets-Sheet 1
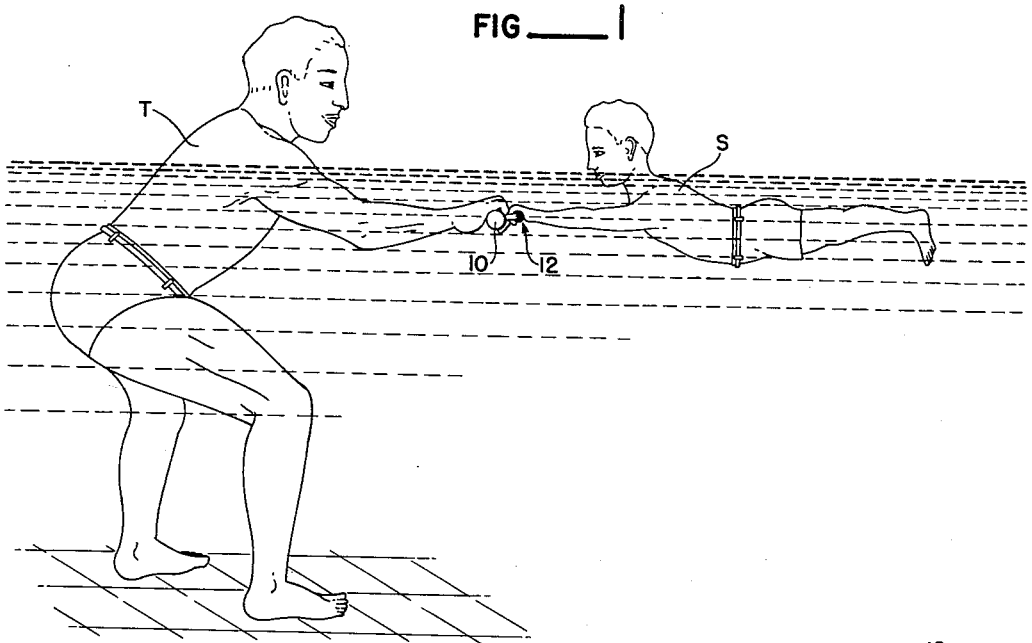
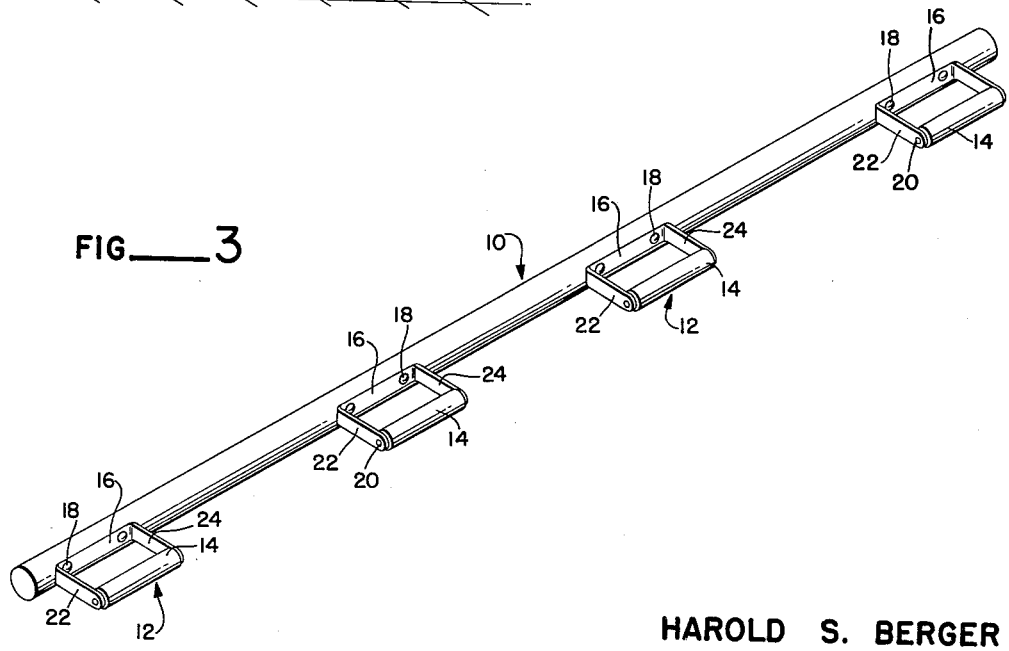
HAROLD S. BERGER
*INVENTOR.*
BY Smith + Tuck July 17, 1962  H. S. BERGER  3,044,186
DEVICE FOR ASSISTING IN SWIMMING INSTRUCTION
Filed July 20, 1959  2 Sheets-Sheet 2
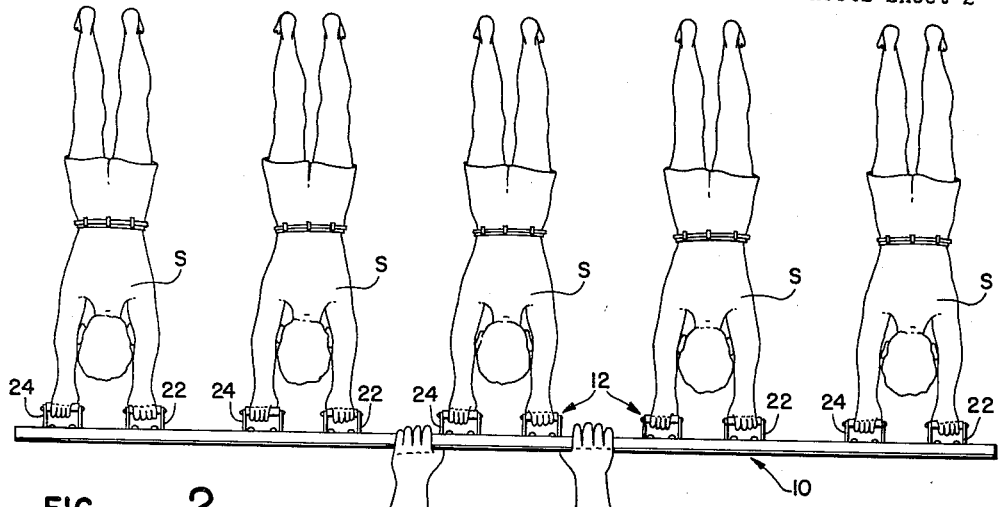
FIG. 2
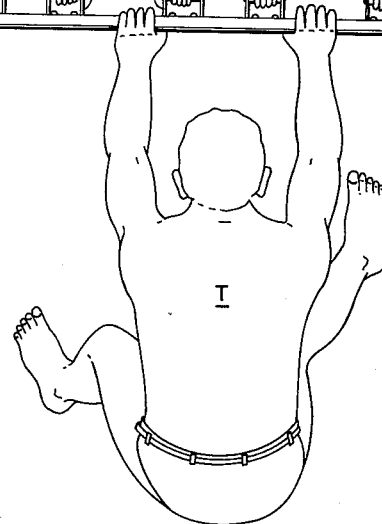
FIG. 4
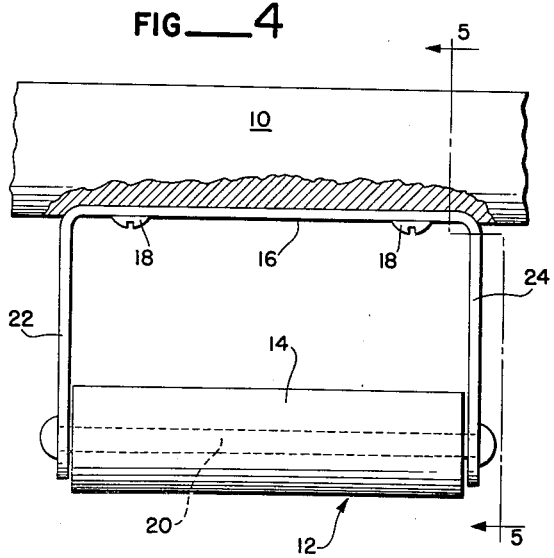
FIG. 5
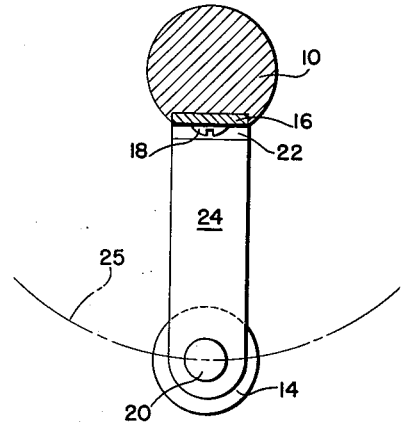
HAROLD S. BERGER
*INVENTOR.*
BY
*Smith & Tuck*

United States Patent Office
3,044,186
Patented July 17, 1962

3,044,186
DEVICE FOR ASSISTING IN SWIMMING INSTRUCTION
Harold S. Berger, 1408 14th Ave., Seattle, Wash., assignor of one-half to George J. Hibbard, Seattle, Wash.
Filed July 20, 1959, Ser. No. 828,128
2 Claims. (Cl. 35—29)

This present invention relates to the general field of devices that assist in the teaching of swimming. More specifically, this device consists of an elongated shaft member which is normally grasped by a swimming instructor near its center and two or more students grasp the device on either side of the instructor.

With a device of this order the instructor has very close control of the students, especially of children who are compelled by their position to pay strict attention to the instructor as he walks backward in water, usually about waist deep. Under this plan the students will be entirely off the bottom and will depend for their vertical position in the water upon the position in which the instructor holds the supporting tube or shaft.

In the teaching of swimming to children, especially, many devices have been provided which give the student either a degree of or complete buoyancy while the instructor imparts instructions to the students by his voice so that they will gradually acquire confidence and familiarity with the swimming procedure. It has been found, however, that when the various students are each more or less on their own as far as propelling themselves is concerned they become separated so that it is difficult to keep them together as an instructional unit. So they may have the benefit of the teacher's instruction to them it is found very convenient with this present device to employ a wooden stick or metal tube of sufficient length so that, with the instructor grasping the same in the center with his spaced hands, four or five children can be instructed as a unit in which they are constantly close to the instructor, who is facing them, and with the students facing the instructor. Where the teacher is, in effect, providing the additional buoyancy required to float the students he also has the opportunity of determining to what degree their bodies are immersed in the water. As soon as adequate confidence is inspired in the students he can, by depressing the tube in the water, actually cause the students to become immersed to approximately the degree most satisfactory for swimming.

The principal object of this present invention therefore is to provide a means whereby the swimming instructor can have complete control of a limited number of students and thereby gradually inspire confidence in them so that he can get them to immerse to a desirable degree.

A further object of this invention is to provide means whereby a single instructor can have the close attention of a limited number of students, positively assured him.

A further object of this invention is to provide mechanical means whereby the instructor can change the support position of the student gradually and without the student being conscious of the gradual change. Normally this would mean lowering the point of support for the student's hands.

Further objects, advantages and capabilities will be apparent from the description and disclosure in the drawings, or may be comprehended or are inherent in the device.

In the drawings:
FIGURE 1 is a vertical sectional view showing the general relationship of the instructor and one of the students undergoing instruction.

FIGURE 2 is a top plan view illustrating how my device may make it possible for a single instructor to give close instruction to as many as five students at one time.

FIGURE 3 is a perspective view illustrating one preferred form of my instruction aid.

FIGURE 4 is a fragmentary view illustrating one of the grips secured in a longitudinal manner to my device.

FIGURE 5 is a cross sectional view taken along the line 5—5 of FIGURE 4.

Referring to the drawings, throughout which like reference characters indicate like parts, 10 designates the elongated tube or shaft forming the principal part of this present device. Shaft 10 may be made of any suitable material, such as wood, or it may be tubular and made of plastic material or metal. In the latter case, however, it is desirable that closures for the tube ends be provided to the end that the entire instruction device will be buoyant at all times. It is necessary that the shaft member 10 be of adequate length so that a reasonable number of students can be spaced along its length and further it should provide reasonable stiffness against bending so that the instructor's will can be imposed uniformly upon the students as a group. This stiffness is provided by a rod of about the size of a large clothes closet hanger rod. If tubular material is employed then it too should also be of fair size, about one and a half to two inches in diameter so that the instructor will have an adequate and comfortable grip to enable him to maneuver and position the shaft.

In order that the students may be spaced in a uniform manner it is very desirable to provide definite hand positioning means for each of their hands. This may be provided in different ways. However, if a straight shaft, either solid as wood or tubular is employed it has been found desirable to use offset hand positioning means after the showing of FIGURES 2 and 3 wherein a plurality of hand grip devices 12 are provided. Each hand grip device preferably is provided with a substantially cylindrical, revolvable hand grip portion 14. Hand grips 14 should be disposed parallel to shaft 10 and spaced a reasonable distance away from the same so that as the instructor turns shaft 10 during the instruction period he can, without apparently changing the position of shaft 10 angularly around its longitudinal axis or with respect to the surface of the water, cause the student's hand grip 14 to change elevation through quite a range. One convenient manner of achieving this is to provide a U-shaped hand grip support member 16 which is fixedly secured to shaft 10 in a manner compatible with the material of which shaft 10 is made. In the case of wood, wood screws as 18 would be preferred. In the case of metal tubing, brazing or welding might be preferable. To obtain free revolution of grip 14 a through rivet 20 coaxially disposed with grip 14 is employed, particularly after the showing of FIGURE 4. The form of hand grip 12 as shown in greater detail in FIGURES 4 and 5 is a desirable structure in that the units may be manufactured and preassembled ready to secure to shaft 10. This arrangement provides positive positioning of the hand and assures the free turning of roller 14. The proportions shown are adequate where member 16 is metal strap stock and insures the rigidity of side bars 22 and 24.

FIGURE 2 illustrates a shaft 10 having ten hand grips so that five child students can be accommodated at one time.

*Method of Use*

My swimming instruction device is not intended to take the place of swimming lessons. It is to be considered a training aid for the instructor T so that he may use my new instructional technique. In this new technique he is able to keep himself in direct contact with all his students at all times, which is so important in the first steps of swimming. With this technique the instructor is normally walking backwards in water about waist deep to him and as he will be facing his students he can at all times be sure that he has the swimming bar or shaft 10 at the proper height with respect to the water's surface. Reference is now made to FIGURES 1 and 2 in which it is believed that it will be clear that the students have their bodies immersed to such a degree that the water is actually holding them up. It requires only a degree of balancing and some forward movement, which the instructor can give, to keep the students' bodies in an optimum position for quickly mastering the swimming technique. In FIGURE 2 it will be noted that the instructor has grasped bar 10 with his hands conveniently spaced apart and at points so that the tractive load on the swimming device will be properly balanced. For this reason it is not practical to provide actual hand grips for the instructor as he may have a heavy student on one end of the bar and a light one on the other so that he may have to adjust his hand grip positions lengthwise of the bar.

It is also desirable that the instructor grasp the bar directly so that he can, by a flexure of his wrists, actually partially revolve bar 10. As the bar is revolved the hand grips 14, which are well spaced from the bar, will follow an arcuate path indicated by 25 in FIGURE 5, on a much greater radius and therefore the student's point of vertical support can be easily changed by the instructor without this change being noticeable to the young student. This is a matter of considerable value in the teaching of swimming. It has been well established that a swimming method that will cause a child to relax while being taught is a very important achievement because when he is relaxed and without fear he needs only slight balancing to keep him from sinking. On the other hand experience has shown that any severe tenseness of the child's body invariably causes him to sink to a level beyond that which is desirable for proper instruction. With the students, of necessity, very close to and facing the instructor at all times they are in a position to clearly receive all the instruction given and the instructor is able to give instruction to all at the same time thus greatly increasing his effectiveness in teaching groups of children to swim.

It is believed that it will be clearly apparent from the above description and the disclosure in the drawings that the invention comprehends a novel construction of a device for assisting in swimming instruction.

Having thus disclosed the invention, I claim:

1. A device for assisting an instructor in giving swimming instruction, comprising: an elongated, stiff shaft, having a diameter permitting comfortable gripping of the same by the hands of the instructor and a plurality of pairs of spaced apart hand positioning means disposed throughout the length of said shaft and adapted to be employed in pairs, one pair for each student to be accommodated; said hand positioning means comprising hand grip devices disposed in alignment on one side of said shaft and spaced away from the same, said hand grip devices provided with substantially cylindrical revolvable hand grip portions.

2. A device for assisting an instructor in giving swimming instruction, comprising: an elongated, stiff shaft, having a diameter permitting comfortable gripping of the same by the hands of the instructor and a plurality of spaced apart hand positioning means disposed throughout the length of said shaft and adapted to be employed in pairs, one pair for each student to be accommodated, said hand positioning means comprising hand grip devices disposed in alignment on one side of said shaft and spaced away from the same, each of said hand grip devices comprising two spaced apart lugs attached to said shaft, an arbor connecting said lugs, and a freely revolvable hand grip spindle positioned on said arbor between said lugs.

References Cited in the file of this patent
UNITED STATES PATENTS

| | | |
|---|---|---|
| 2,545,009 | Spiteri | Mar. 13, 1951 |
| 2,593,321 | Lindgren | Apr. 15, 1952 |
| 2,708,759 | Strawn | May 24, 1955 |
| 2,709,266 | Munn | May 31, 1955 |
| 2,859,458 | Calarco | Nov. 11, 1958 |

FOREIGN PATENTS

| | | |
|---|---|---|
| 694,236 | Germany | July 27, 1940 |